United States Patent [19]

Rozman

[11] Patent Number: 4,937,508

[45] Date of Patent: Jun. 26, 1990

[54] VSCF START SYSTEM WITH PRECISION VOLTAGE

[75] Inventor: Gregory I. Rozman, Rockford, Ill.

[73] Assignee: Sundstrand Corporation, Rockford, Ill.

[21] Appl. No.: 351,045

[22] Filed: May 12, 1989

[51] Int. Cl.[5] .............................................. H02P 6/00

[52] U.S. Cl. ...................................... 318/254; 318/138

[58] Field of Search ......................... 318/138, 254, 439

[56] References Cited

U.S. PATENT DOCUMENTS

| | | | |
|---|---|---|---|
| 3,908,130 | 9/1975 | Lafuze | 318/800 X |
| 4,123,692 | 10/1978 | Gilmore et al. . | |
| 4,359,674 | 11/1982 | Gotou | 318/254 |
| 4,382,275 | 5/1983 | Glennon . | |
| 4,442,386 | 4/1984 | Uchida et al. | 318/254 |
| 4,480,299 | 10/1984 | Muto et al. . | |
| 4,490,666 | 12/1984 | Tanamachi et al. . | |
| 4,631,459 | 12/1986 | Fujioka et al. | 318/254 |
| 4,712,050 | 12/1987 | Nagasawa et al. | 318/254 |
| 4,743,815 | 5/1988 | Gee et al. | 318/254 |

*Primary Examiner*—Bentsu Ro

*Attorney, Agent, or Firm*—Wood, Phillips, Mason, Recktenwald & Vansanten

[57] ABSTRACT

The problem of obtaining precision control of a synchronous motor is solved in an engine start control which utilizes a fundamental wave component as a feedback value. The motor receives power from a main inverter and an excitation inverter. The inverters are controlled by a control unit which includes a pulse width modulation generator which is responsive to a voltage command and a commutation command to develop switching signals for controlling the switches in the main inverter. At speeds above a preselected minimum speed, the commutation angle command and the voltage command are developed in a closed loop manner responsive to a feedback signal representing the fundamental output of the inverter.

12 Claims, 5 Drawing Sheets

VSCF START SYSTEM WITH PRECISION VOLTAGE

FIELD OF THE INVENTION

This invention relates to electrical power systems and more particularly to a dual mode control system therefor including a generate mode of operation and a start mode of operation.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power in a variable speed constant frequency (VSCF) system including a power converter which may develop, for example, 115/200 $V_{ac}$ power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Rozman et al. co-pending application entitled VSCF Start System with Selectable Input Power Limiting, Ser. No. 270,625, filed Nov. 14, 1988, and owned by the assignee of the present invention, which is hereby incorporated by reference herein, discloses a start control which provides input power limitations in accordance with input power requirements. Specifically, the start control described therein utilizes a pulse width modulated inverter to control torque and power as functions of the output voltage and commutation angle. Specifically, the start control maintains the volts/hertz ratio at a constant and uses closed loop control of the commutation angle at speeds above a preselected minimum to control current and to limit input power.

Such a start control system utilizes open loop voltage control which assumes that the constant volt/hertz ratio is maintained. In fact, voltage may increase or decrease if the power source is not accurate. Also, if the speed signal is noisy, then the ratio may not be maintained.

When driving a synchronous motor at various frequencies, it is important to maintain a constant volt/hertz ratio. If this ratio is too high, then the motor may saturate. If the ratio is too low, then the motor develops less torque and less power.

Conventional voltage control schemes implement closed loop control by detecting inverter output voltage and correcting the PWM signal by the difference between this voltage and a voltage reference. However, higher harmonic components in the inverter output limit the accuracy of such schemes. Particularly, the armature component of the magnetic flux is generated by the fundamental component of the output voltage and the higher harmonics detrimentally affect the desired control scheme.

The present invention is intended to overcome one or more of the problems as set forth above.

SUMMARY OF THE INVENTION

In accordance with the present invention, a start control system for a brushless DC machine is operable to precisely control machine voltage.

Broadly, there is disclosed herein a start control system for a brushless electro-motive machine having a rotor and a stator having a stator coil which is controllably energized from a source of DC power defining a positive and a negative DC voltage for imparting rotation to the rotor. The control system includes means for sensing the rotational position of the rotor, and switching means coupled between the source of DC power and the stator coil for alternately applying the positive and negative voltage to the coil according to the rotational position of the rotor. Means are included for sensing the switching means output voltage, and means are coupled thereto for developing a reference signal representing the actual phase displacement and amplitude of the output voltage. Means are provided for developing an output voltage amplitude reference representing a desired output voltage level, and means for generating a phase displacement reference representing a desired phase displacement. Control means are coupled to the developing means, the first and second generating means and the switching means for controlling the switching means to maintain the output voltage at the desired voltage level and phase displacement.

Specifically, the disclosed start system is used for starting an engine using a brushless synchronous generator operating as a motor. The motor receives power from a main inverter and an excitation inverter. These inverters are controlled by a control unit which provides for output voltage control.

The control unit includes a pulse width modulation (PWM) generator which is responsive to a voltage command and a commutation angle command to develop switching signals for controlling the switches in the main inverter. The voltage command is used to vary the duty cycle of the PWM signals. The commutation angle command is used to phase advance the inverter output.

The polyphase output voltage developed by the main inverter is sensed and filtered and converted to a high frequency sinusoidal signal. The amplitude and phase displacement of the sinusoidal signal represent the amplitude and phase displacement of the fundamental output. The phase displacement of the sinusoidal signal is compared to a commutation angle reference to develop the commutation angle command. The amplitude of the sinusoidal signal is compared to a voltage reference to develop the voltage command.

It is an additional feature of the invention to provide disabling of the closed loop control at low speeds.

Particularly, first and second switches are controlled by a speed detector to disable the closed loop control at low speeds to provide smooth starting. Instead, the voltage reference and the commutation angle reference are used as the voltage command and the commutation angle command, respectively.

Further features and advantages of this invention will readily be apparent from the specification and from the drawings.

DESCRIPTION OF THE INVENTION

Figure 1:
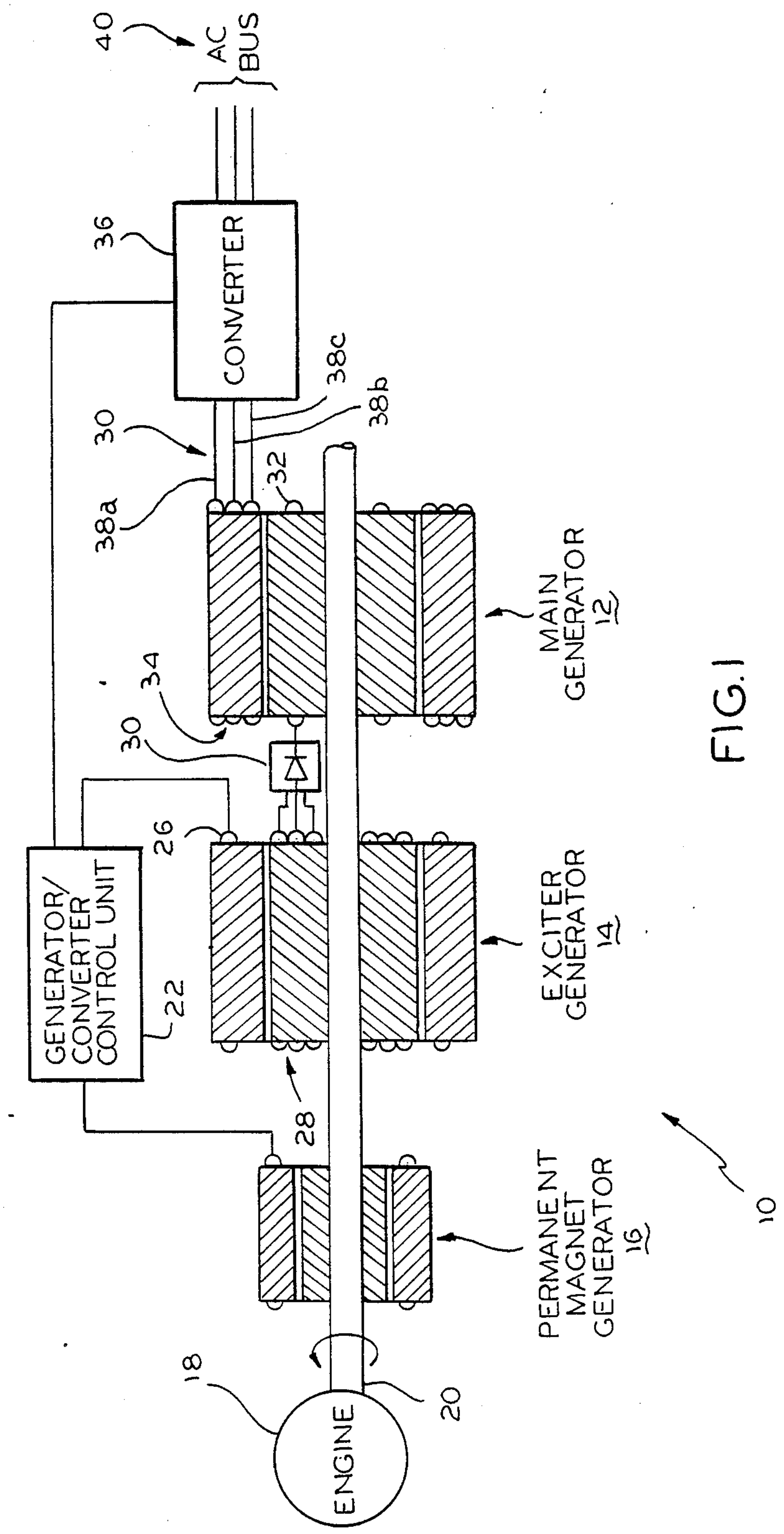
FIG. 1 is a combined diagrammatic illustration-block diagram of an electrical system incorporating the start system of the present invention.

Referring first to FIG. 1, an electrical power system 10 includes a main generator 12, an exciter generator 14 for providing main field current to the generator 12 and a permanent magnet generator (PMG) 16. Each of the main generator 12, exciter generator 14 and PMG 16 are driven by an engine 18 through a common shaft 20.

A generator/convertor control unit (GCCU) 22 receives the power developed by the PMG and delivers a controlled current to a field winding 26 of the exciter generator 14. As is conventional in brushless power systems, rotation of the shaft 20 by the engine 18 results in generation of a polyphase voltage in armature windings 28 of the exciter generator 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator armature windings 34. The armature windings 34 develop polyphase output power which is delivered to a converter 36 over a bus 38 comprising at least three conductors **38*a*, 38*b*, and 38*c***.

In a typical application, the engine 18 is the main engine in an aircraft, and the converter 36 is a variable speed constant frequency (VSCF) converter for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
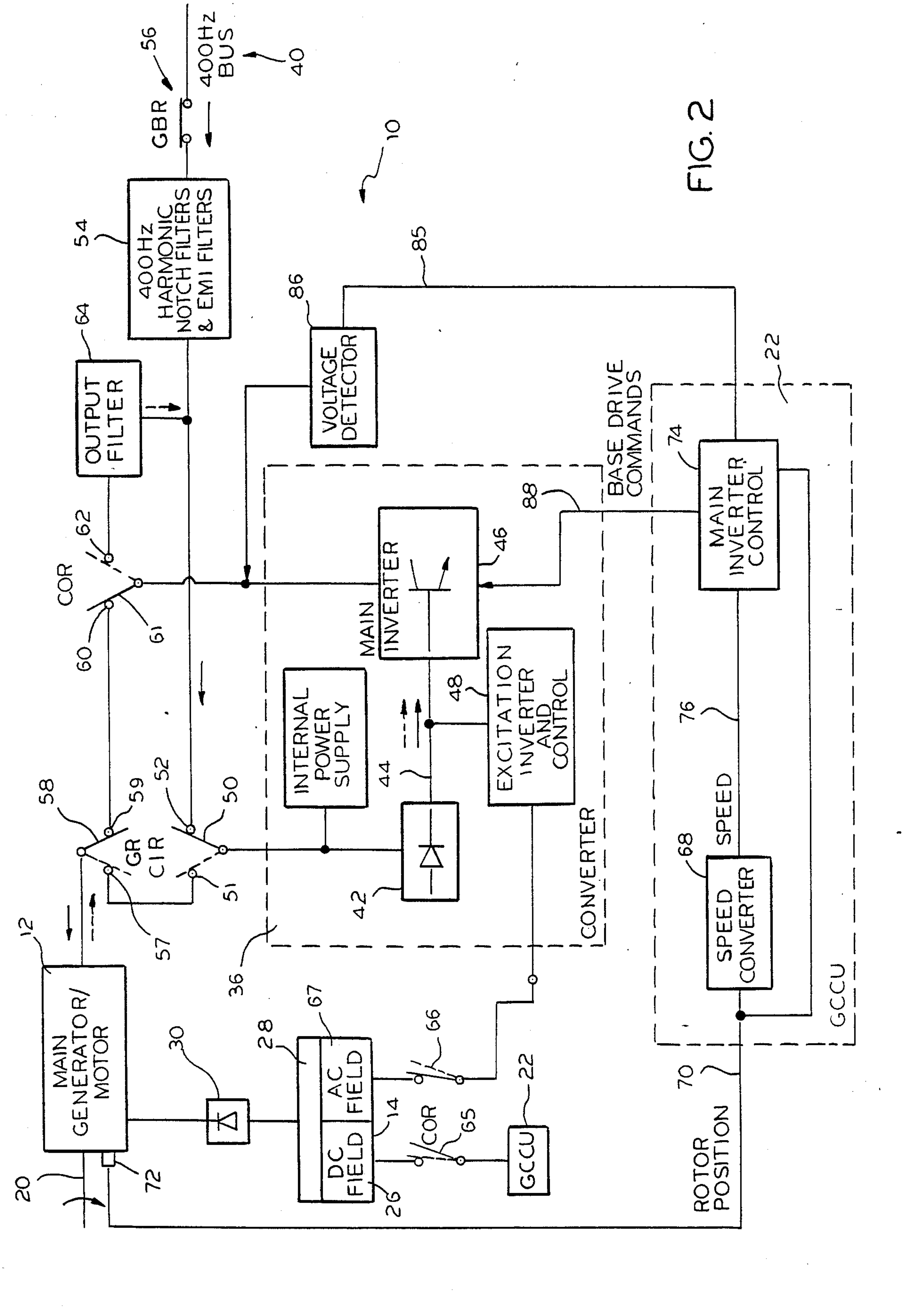
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link and filter 44 to a DC/AC converter 46. Particularly, according to the illustrated embodiment of the invention, the AC/DC converter 42 comprises a full wave bridge rectifier circuit of conventional construction which is operable to convert three phase AC power to DC power, the DC link 44 includes a conventional filter, and the DC/AC converter 46 comprises a main inverter circuit, described more specifically below relative to FIG. 4. The converter 36 also includes an excitation inverter and control 48 connected to the DC link 44 for developing AC power for the motor field during the start mode of operation.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the windings 34 shown in FIG. 1. The second fixed contact 59 is connected to a first fixed contact 60 of a converter output relay (COR). The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter generator field winding 26 to the GCCU 22. The second switch 66 connects the excitation inverter 48 to an AC start field winding 67 of the exciter generator 14. Specifically, the excitation for the wound field main generator/motor 12 cannot be supplied at zero speed by the exciter generator 14. Accordingly, the excitation inverter 48 and the start field winding 67 function as a rotary transformer. Specifically, AC power delivered to the exciter generator AC field winding 67 develops corresponding AC power in the armature windings 28 for powering the motor field winding 32.

During engine start, the relays GR, CIR and COR are operated as shown in solid lines in FIG. 2. Conversely, in the generate mode, these relays GR, CIR and COR are operated as shown in dashed lines in FIG. 2.

Although the relays GR, CIR and COR are shown as providing a single line connection, each of the relays is provided with suitable switches to switch three phase power, as is well known.

The GCCU 22 includes a speed converter 68 which receives a rotor position signal on a line 70 from a rotor position sensor 72 associated with the main generator 12. The position sensor 72 may be, for example, a conventional resolver. The rotor position signal 70 is also transferred to a main inverter control 74. The speed converter 68 may perform a derivative operation for converting rotor position to speed, as is well known. The main inverter control also receives the speed signal on a line 76 from the speed converter 68. The main inverter control 74 develops base drive commands on a line 88 for controlling the inverter 46.

In the generate mode of operation, with the relays GR, CIR and COR as illustrated in dashed lines, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the inverter 46 which converts the power to AC power of constant frequency. The constant frequency AC power from the inverter 46 is delivered through the CIR relay movable contact 61 to the second fixed contact 62, through the output filter 64, and the filter 54 to the AC bus 40. Field power from the exciter generator 14 is developed from the GCCU 22 through the first field control switch 65 to the DC field coil 26.

In the start mode of operation, the relays GR, CIR and COR are operated as shown solid lines. Particularly, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the armature windings of the main generator/motor 12. Field power to the main generator 12 is provided by the exciter 14 and is developed from the excitation inverter and control 48 through the second COR field control switch 66 to the AC field coil 67.

Figure 3:
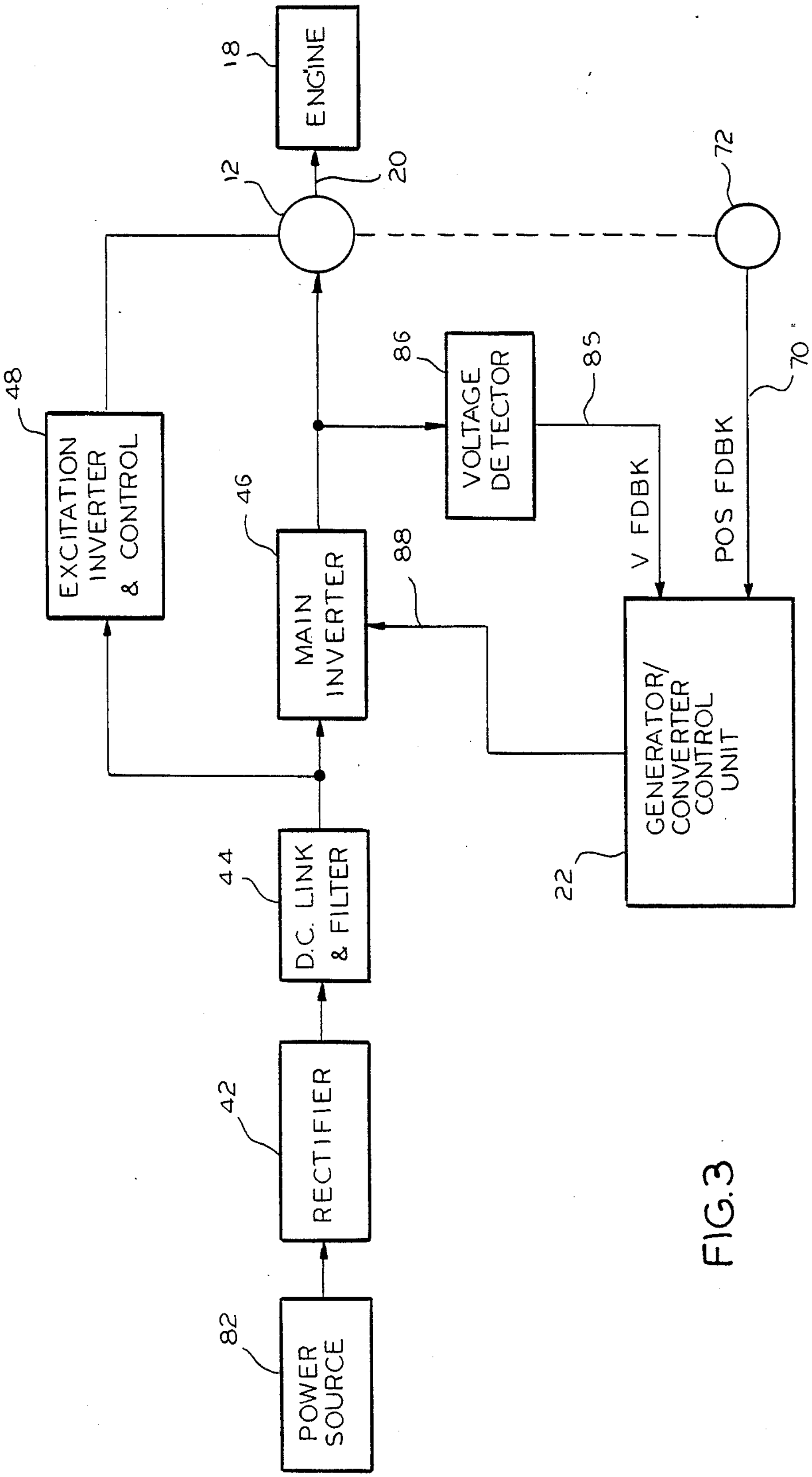
FIG. 3 is a block diagram of the control system specifically illustrating the start mode of operation.

Referring now to FIG. 3, a block diagram representation more specifically illustrates the operation of the electrical power system 10 according to the invention in the start mode of operation. A power source 82 is coupled to the rectifier 42 which is coupled through the DC link and filter 44 to both the main inverter 46 and the excitation inverter and control 48. The GCCU 22 receives a voltage feedback signal on a line 85 from a voltage detector 86 which senses the three phase applied output voltage from the main inverter 46 to the motor 12. The GCCU 22 also receive the position signal on the line 70 from the rotor position sensor 72. As discussed above, the GCCU 22 develops the base drive commands for the main inverter 46 on the line 88.

Figure 4:
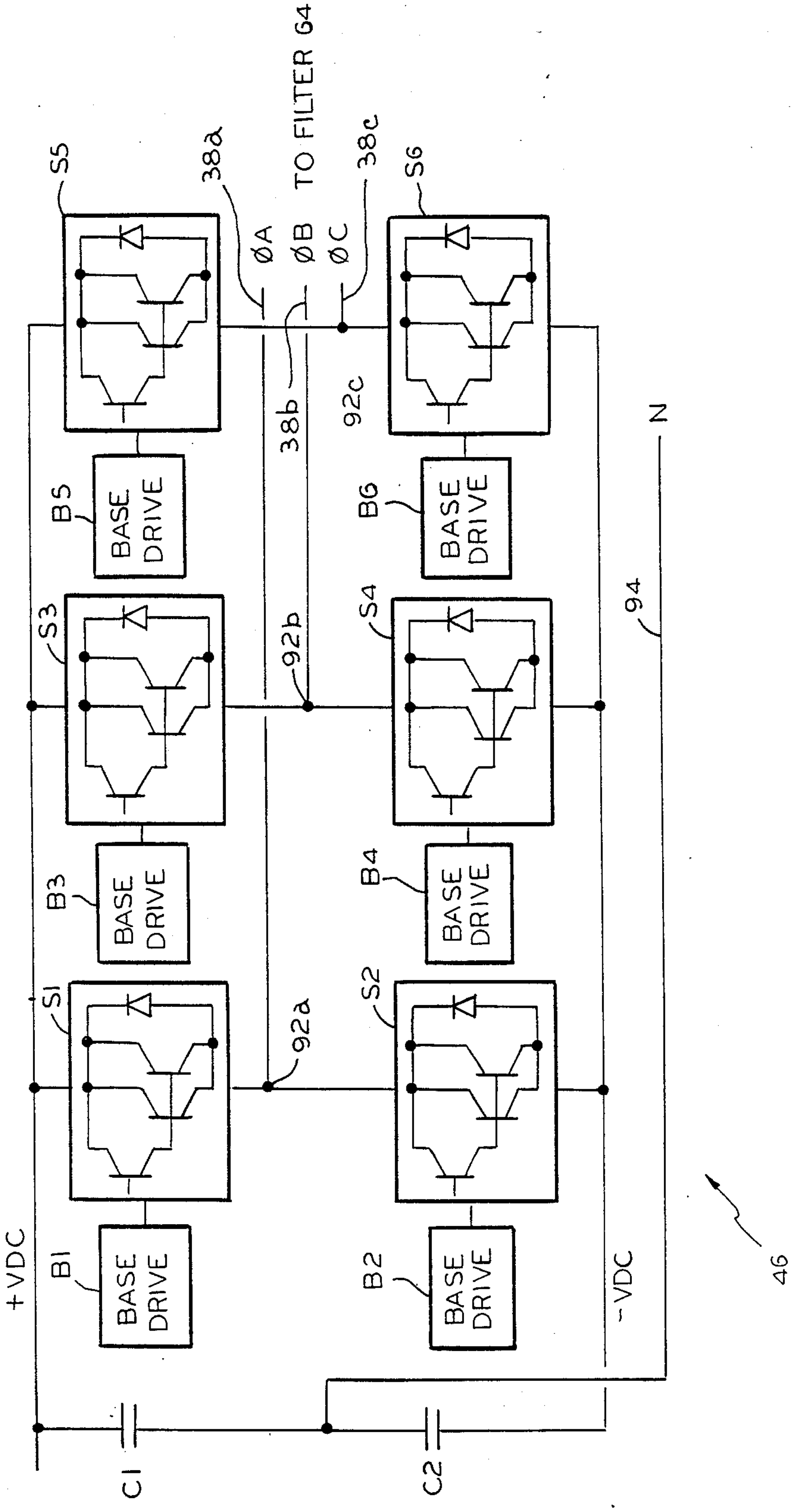
FIG. 4 is a schematic diagram illustrating the start inverter of FIG. 3.

Referring to FIG. 4, a schematic diagram illustrates one alternative circuit for the main inverter 46. Particularly, the inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner. The switches S1–S6 are connected between the plus voltage DC rail and the minus voltage DC rail of the DC link filter 44. The 3-phase armature windings 34 of the main generator 12 are connected by the lines **38*a*–38*c*, respectively, to junctions 92*a*–92*c* between pairs of series-connected switch circuits S1–S6. A neutral line 94 to the main generator 12 is connected at a junction between filter capacitors C1 and C2 across the DC link filter 44**.

Although not shown, the excitation inverter and control 48 may be of generally similar construction to the main inverter 46 illustrated in FIG. 4. Alternatively, other circuits may be utilized for either or both of the main inverter 46 and the excitation inverter and control 48, as is well known.

Although no implementation for the control of the excitation inverter and control 48 is shown herein, reference may be had to the Rozman et al. co-pending application incorporated by reference herein for illustrative embodiments thereof.

Figure 5:
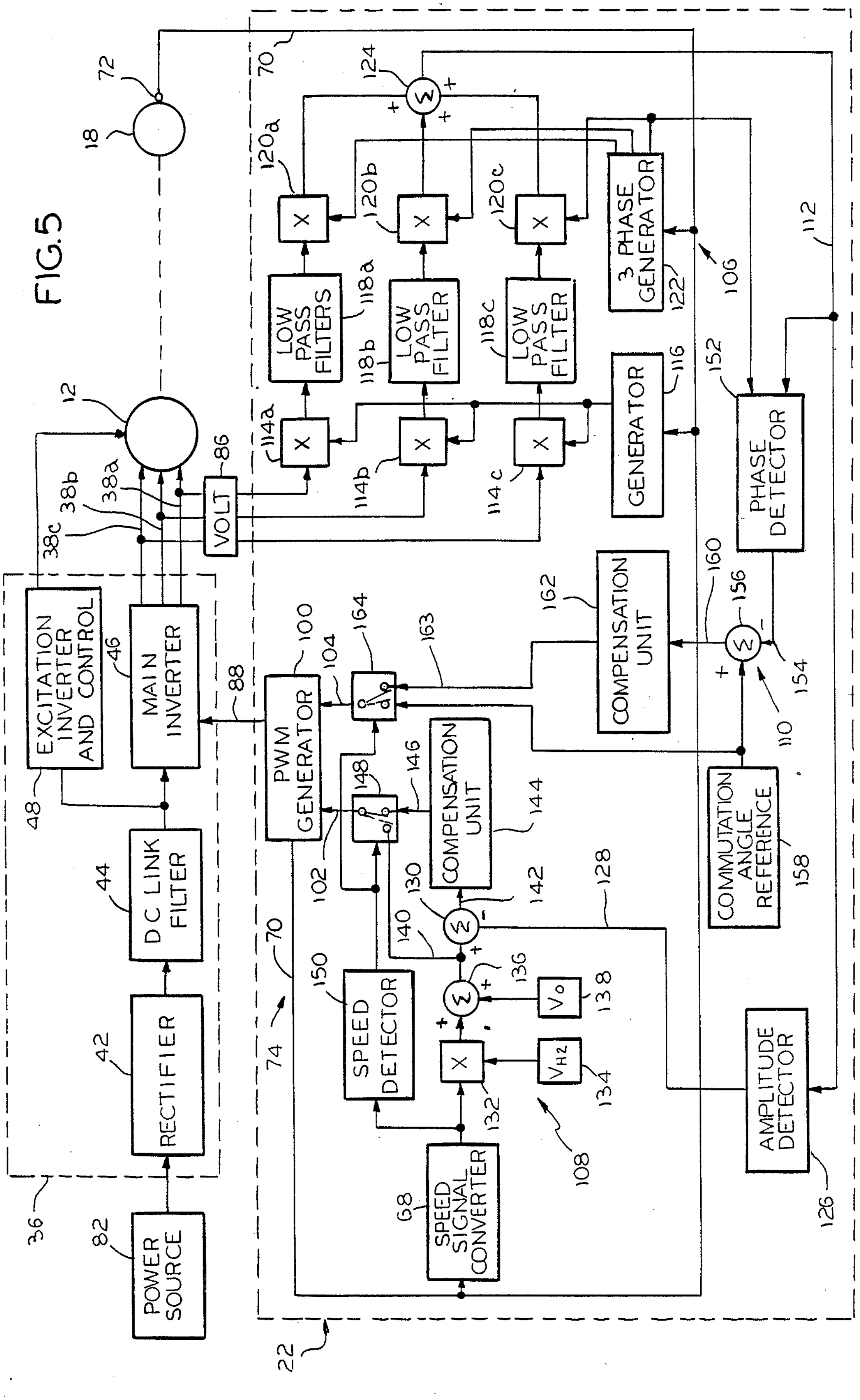
FIG. 5 is a more detailed block diagram of the generator/converter control unit of FIG. 3.

With reference to FIG. 5, a block diagram illustrates the implementation of the GCCU 22, see FIG. 3, according to the invention, including the main inverter control 74.

The main inverter control 74 includes a PWM generator 100. The PWM generator 100 receives the position signal on the line 70, a voltage command on a line 102, and a commutation angle command on a line 104. The PWM generator 100 derives the base drive commands which are transferred on the line 88 to the base drive circuits B1–B6 of the main inverter 46, see FIG. 4. The PWM generator 100 may be of any conventional construction. Particularly, the PWM generator 100 develops base drive signals to control the output voltage of the main inverter 46, by varying the duty cycle of the PWM signals. The duty cycle is proportional to the voltage command received on the line 102. The fundamental frequency of the inverter output is determined by motor speed. The output waveforms are synchronized to the input of the rotor position as determined by the sensor 72, see FIG. 3. The phase difference between rotor position and inverter output is adjusted in accordance with the commutation angle command on the line 104.

The voltage command and commutation command are developed utilizing an inverter output feedback control 106, a voltage control 108, and a commutation angle control 110.

The feedback control 106 is operable to develop a feedback signal on a line 112 which represents fundamental inverter output voltage, as discussed immediately below.

The feedback control 106 includes multiplier circuits $114_A$, $114_B$ and $114_C$ which receive feedback signals representing the voltage on the inverter output lines $38_A$–$38_C$ as determined by the voltage detector 86. The PWM output voltages from the main inverter 46 are represented by the following equations:

$$U_A = A\sin(\omega t + \phi) + \Sigma \text{ high harmonics}$$
$$U_B = A\sin(\omega t + 120° + \phi) + \Sigma \text{ high harmonics}$$
$$U_C = A\sin(\omega t + 240° + \phi) + \Sigma \text{ high harmonics}$$

The three output voltages are multiplied in the multipliers $114_A$–$114_C$ by a sinusoidal signal received from a generator 116. The generator 116 receives the position signal from the rotor position detector 72 and develops a sinusoidal signal having a frequency equal to the fundamental frequency, i.e. sin(ωt). The generator 116 is of conventional construction and may operate, for example, by multiplying the output of the position detector 72 by the number of pairs of poles of the motor 12 and using the lookup table method to generate the sinusoidal signals. The high frequency harmonic components from the multipliers $114_A$–$114_C$ are filtered out using respective low pass filters $118_A$–$118_C$ in order to develop DC signals represented by the following equations:

$$U_A' = A\cos(\phi)$$
$$U_B' = A\cos(\phi + 120°)$$
$$U_C' = A\cos(\phi + 240°)$$

The filtered signals are multiplied in respective multipliers $120_A$–$120_C$ by high frequency sinusoidal signals generated by a 3-phase generator 122. Specifically, the generator signals are represented by the following equations:

$$W_A = \cos(\theta t)$$
$$W_B = \cos(\theta t + 120°)$$
$$W_C = \cos(\theta t + 240°)$$

The phase of the 3-phase generator 122 is synchronized with the output of the position detector 72, with the outputs of each being separated by 120°. The outputs of the three multipliers $120_A$–$120_C$ are summed by a summer 124. The output of the summer 124 is a signal on the line 112, discussed above, having a magnitude and phase displacement equal to the magnitude and phase displacement of the fundamental component of the main inverter output. Specifically, the signal on the line 112 is represented by the following equation:

$$U = A\cos(\theta t + \phi).$$

The voltage control 108 includes an amplitude detector 126 which receives the signal on the line 112 and develops an output on a line 128 which is applied to a summer 130. The output on the line 128 is proportional to the amplitude of the fundamental signal on the line 112. Specifically, the signal on the line 128 represents the actual level of the applied voltage. To develop a desired voltage, the rotor position signal from the detector 72 is converted to a speed signal using the speed signal convertor 68. A multiplier circuit 132 multiplies the speed value by a constant from a block 134. Particularly, the constant represents a desired volt/hertz speed ratio. A summing circuit 136 receives the output from the multiplier 132 and a constant $V_0$ from a block 138. The Constant $V_0$ is proportional to the "boost" voltage which is required to offset the IR drop of the machine at low speeds. The output of the summer 136 on a line 140 represents the desired amplitude of the applied voltage.

The desired voltage on the line 140 is applied to the summer 130 which subtracts the feedback amplitude signal on the line 128 therefrom to develop a voltage amplitude error on a line 142. The voltage amplitude error on the line 142 is applied to a compensation unit 144 which may be, for example, a proportional and integral control. The output of the compensation unit 144 on a line 146 and the desired voltage signal on the line 140 are applied to switch inputs of a first switch 148 which has as its output the voltage command on the line 102. The first switch 148 is controlled by a speed detector 150 which has as its input a speed signal from the convertor 68. Particularly, the first switch 148 operates in conjunction with the speed detector 150 to couple the line 146 to the line 102 at all speeds above a preselected minimum speed. Resultantly, at such speeds the voltage command on the line 102 is controlled in a closed loop manner. The first switch 148 is also controlled by the speed detector 150 to disable the control loop at very low speeds to avoid interactions with the filters $114_A$–$114_C$. Specifically, at low speeds below the preselected minimum, the speed detector 150 operates the first switch 148 to couple the line 140 to the line 102. Resultantly, at low speeds the voltage command is determined in an open loop manner by the voltage reference which is set proportional to rotor speed.

The commutation angle control 110 includes a phase detector 152 which receives the high frequency fundamental feedback signal on the line 112 and one of the high frequency signals from the 3-phase generator 122 to develop a commutation angle feedback signal on a line 154. Specifically, the phase detector 152 compares the phase reference from the 3-phase generator 122 to the fundamental on the line 112 to obtain the phase difference which represents the actual commutation angle. The commutation angle feedback on the line 154 is applied to a summer 156 which also receives a commutation angle reference from a block 158. The commutation angle reference 158 may be developed in any known manner, such as is described in the Rozman et al. copending application incorporated by reference herein. The summer 156 subtracts the feedback signal on the line 154 from the reference signal to develop a commutation angle error on a line 160 which is applied to a compensation unit 162. The output of the compensation unit 162 and the commutation angle reference 158 are coupled to inputs of a second switch 164, similar to the first switch 148. The output of the second switch 164 is coupled to the line 104. The second switch 164 is also operated by the speed detector 150. Specifically, at speeds above the preselected minimum speed, discussed above, the line 104 is coupled to the line 163 so that the commutation angle command on the line 104 is controlled in a closed loop manner and represents the compensated error signal developed by the compensation unit 162. However, the second switch 164 is controlled by the speed detector 150 at low speeds to disable the closed loop control to avoid interaction with the filters $114_A$–$114_C$. Specifically, at low speeds, the commutation angle reference 158 is coupled directly to the line 104 so that the commutation angle command is determined in an open loop manner in accordance with the commutation angle reference 158.

The operation of the main inverter control 74 begins with the speed at zero and the voltage command on the line 102 representing the boost voltage $V_0$, and the commutation angle command on the line 104 representing the commutation angle reference 158. The PWM generator 100 begins to develop base drive commands to the main inverter 46 according to the initial rotor position developed by the detector 72 to cause initial movement of the rotor. As speed builds up, the commutation angle command on the line 104 is determined by the commutation angle reference 158 while the voltage command on the line 102 is increased proportional to speed in an open loop manner. When speed exceeds the preselected minimum value of the speed detector 150, the voltage control 108 and the commutation angle control 110 switch to closed loop control and utilize the fundamental wave component on the line 112 as a feedback component in order to control the voltage command on the line 102 and the commutation angle command on the line 104 at the desired levels to provide precise control of the synchronous motor 12.

The GCCU 22 described herein can be implemented with suitable electrical or electronic circuits, or with a software programmed control unit, as is obvious to those skilled in the art.

In accordance with the above, a start control for a motor provides precise control of a synchronous motor using control of output voltage and commutation angle.

I claim:

1. A control system for a brushless electro-motive machine having a rotor and a stator having a stator coil which is controllably energized from a source of DC power defining a positive and a negative DC voltage for imparting rotation to the rotor, comprising:

position sensing means for sensing the rotational position of said rotor;

switching means coupled between the source of DC power and said stator coil for alternately applying the positive and negative voltage to said coil, said switching means defining an output voltage;

voltage sensing means for sensing said switching means output voltage;

means coupled to said voltage sensing means for developing a feedback signal representing the phase displacement and amplitude of said output voltage;

first means for generating an output voltage reference signal;

second means for generating a commutation angle reference signal; and control means coupled to said first and second generating means, said position sensing means and said developing means for controlling said switching means so that said switching means develop said output voltage in accordance with said output voltage reference signal, said commutation angle reference signal, and said feedback signal.

2. The control system of claim 1 further comprising speed sensing means for sensing the speed of rotational movement of said rotor, and wherein said first generating means is coupled to said speed sensing means and generates said output voltage reference signal relative thereto.

3. The control system of claim 2 wherein said first generating means includes means for multiplying said rotor speed by a constant representing a desired voltage to speed ratio.

4. A start control system for a brushless DC machine having a rotor and a stator having a stator coil which is controllably energized from a source of DC power defining a positive and a negative DC voltage for imparting rotation to the rotor, comprising:

position sensing means for sensing the rotational position of said rotor;

switching means coupled between the source of DC power and said stator coil for alternately applying the positive and negative voltage to said coil, said switching means defining an output voltage;

voltage sensing means for sensing said switching means output voltage;

means coupled to said voltage sensing means for developing a feedback signal representing phase advance and amplitude of said output voltage;

first means for generating an output voltage amplitude reference signal;

second means for generating a commutation angle reference signal; and control means coupled to said first and second generating means, said position sensing means and said developing means for controlling said switching means so that said switching means develop said output voltage in accordance with the difference between said output voltage amplitude reference signal and said amplitude of said output voltage and the difference between said commutation angle reference signal and said phase advance of said output voltage to provide precise control of the output voltage.

5. The control system of claim 4 further comprising speed sensing means for sensing the speed of rotational movement of said rotor, and wherein said first generating means is coupled to said speed sensing means and generates said output voltage amplitude reference signal relative thereto.

6. The control system of claim 5 wherein said first generating means includes means for multiplying said rotor speed by a constant representing a desired voltage to speed ratio.

7. The control system of claim 4 further comprising speed sensing means for sensing the speed of rotational movement of said rotor, and wherein said control means includes means for controlling said switching means so that said switching means develop said output voltage in accordance with said output voltage amplitude reference signal and said commutation angle reference signal at rotor speeds below a preselected minimum speed.

8. A start control for a brushless DC machine having a rotor and a stator having coil which are controllably energized in accordance with a commutation angle command and a voltage command for imparting rotation to the rotor, comprising:

developing means for developing a feedback signal representing a fundamental output voltage applied to the stator coil;

first determining means coupled to said developing means for determining amplitude of the fundamental output voltage;

second determining means coupled to said developing means for determining phase displacement of the fundamental output voltage;

first generating means for generating an amplitude reference representing a desired amplitude for the fundamental output voltage;

second generating means for generating a commutation angle reference representing a desired phase advance for the fundamental output voltage;

third determining means coupled to said first generating means and said first determining means for determining the voltage command in accordance with said determined amplitude and said desired amplitude; and fourth determining means coupled to said second generating means and said second determining means for determining the commutation angle command in accordance with said determined phase displacement and said desired phase advance.

9. The start control of claim 8 further comprising speed sensing means for sensing the speed of rotational movement of said rotor, and wherein said first generating means is coupled to said speed sensing means and generates said amplitude reference relative thereto.

10. The start control of claim 9 wherein said first generating means includes means for multiplying said rotor speed by a constant representing a desired voltage to speed ratio.

11. The start control of claim 8 further comprising speed sensing means for sensing the speed of rotational movement of said rotor, and wherein said third determining means determines the voltage command in accordance with the difference between said determined amplitude and said desired amplitude at speeds above a preselected minimum speed, and said fourth determining means determines the commutation angle command in accordance with the difference between said determined phase displacement and said desired phase advance at speeds above the preselected minimum speed.

12. The start control of claim 8 wherein said developing means includes means for detecting the voltage applied to the stator coil, means for filtering said detected applied voltage, and means for converting said filtered voltage to a signal having an amplitude and phase corresponding to the amplitude and phase of the fundamental output voltage.

* * * * *